US009767275B2

(12) United States Patent
Krisna et al.

(10) Patent No.: US 9,767,275 B2

(45) Date of Patent: Sep. 19, 2017

(54) METHOD OF ENFORCING CONTROL OF ACCESS BY A DEVICE TO A SECURE ELEMENT, AND CORRESPONDING SECURE ELEMENT

(71) Applicants: Balamurali Krisna, South Jakarta Selatan (ID); Dewi Lestari, South Jakarta Selatan (ID); Eric Setiawan, South Jakarta Selatan (ID)

(72) Inventors: Balamurali Krisna, South Jakarta Selatan (ID); Dewi Lestari, South Jakarta Selatan (ID); Eric Setiawan, South Jakarta Selatan (ID)

(73) Assignee: PT OBERTHUR TECHNOLOGIES INDONESIA LTD., South Jakarta Selatan (ID)

( * ) Notice: Subject to any disclaimer, the term of this patent is extended or adjusted under 35 U.S.C. 154(b) by 78 days.

(21) Appl. No.: 14/331,321

(22) Filed: Jul. 15, 2014

(65) Prior Publication Data

US 2015/0026759 A1 Jan. 22, 2015

(30) Foreign Application Priority Data

Jul. 17, 2013 (EP) .................................... 13176948

(51) Int. Cl.
*G06F 17/00* (2006.01)
*G06F 21/53* (2013.01)
(Continued)

(52) U.S. Cl.
CPC ............ *G06F 21/53* (2013.01); *G06F 21/604* (2013.01); *G06F 21/77* (2013.01)

(58) Field of Classification Search
CPC ............................... G06F 21/604; G06F 21/62
See application file for complete search history.

(56) References Cited

U.S. PATENT DOCUMENTS

2008/0022381 A1* 1/2008 Le Saint ................. G06F 21/52 726/9
2009/0025074 A1 1/2009 Le Saint et al.
(Continued)

FOREIGN PATENT DOCUMENTS

GB 2 457 221 8/2009

OTHER PUBLICATIONS

GlobalPlatform, "GlobalPlatform Device Technology—Secure Element Access Control", version 0.10.0, Mar. 2012, http%3A%2F%2Famifan.googlecode.com%2Fsvn-history%2Fr79%2Ftrunk%2FDocuments%2FGPD_SE_Access_Control_v0_10_0.pdf &usg=AFQjCNE7gClOdENBCvxvto32cahEekHtbw.*
(Continued)

*Primary Examiner* — Harunur Rashid
*Assistant Examiner* — Quy Pham
(74) *Attorney, Agent, or Firm* — Young & Thompson

(57) ABSTRACT

A method of enforcing control of access by a hosting device to a secure element, and a secure element are described. The method includes steps performed by the secure element: receiving a request for retrieving at least one access rule controlling access to at least one application of the secure element, from access rules stored in the secure element; outputting at least one access rule retrieved from the stored access rules, wherein an access rule controlling access to an application of the secure element is retrieved by searching only in access rules stored in a security domain to which the application belongs in the secure element, or an access rule controlling access to an application of the secure element is stored only in a security domain to which the application belongs in the secure element.

5 Claims, 5 Drawing Sheets

(51) Int. Cl.
*G06F 21/60* (2013.01)
*G06F 21/77* (2013.01)

(56) References Cited

U.S. PATENT DOCUMENTS

| | | | | |
|---|---|---|---|---|
| 2013/0310003 | A1* | 11/2013 | Sadhvani .............. | H04W 12/06 455/411 |
| 2014/0189880 | A1* | 7/2014 | Funk ....................... | G06F 21/62 726/27 |

OTHER PUBLICATIONS

European Search Report dated Dec. 4, 2013, corresponding to EP 13 17 6948.

* cited by examiner

METHOD OF ENFORCING CONTROL OF ACCESS BY A DEVICE TO A SECURE ELEMENT, AND CORRESPONDING SECURE ELEMENT

This application claims priority from EP patent applications No. 13176948.1 of Jul. 17, 2013 which is incorporated herein by reference.

FIELD OF THE INVENTION

The present invention relates generally to "secure elements" and more specifically to a method of enforcing control of access by a hosting device to a secure element, and to such a secure element.

BACKGROUND OF THE INVENTION

GlobalPlatform technology defines the secure elements, for example in specification "GlobalPlatform Card Specification—Version 2.2.1".

A Secure Element (SE) is known to be a tamper resistant component, possibly removable, which is used in a hosting device to provide the security, confidentiality, and multiple-application environment required to support various business models. A secure element may be compliant with the norm ISO/IEC 7918. An usual hosting device is a mobile phone.

Such a Secure Element may exist in any form factor such as UICC (standing for Universal Integrated Circuit Card), embedded SE, smartSD, smart microSD, etc.

A security mechanism therein, called Secure Element access control is used in addition to existing protection mechanisms (such as permissions or security OS policy limiting access to sensitive APIs). The access control is designed to prevent unauthorized access to resources in the Secure Elements and typically to prevent denial of services attacks (PIN blocking, selection of non multi-selectable applets, etc.).

This access control mechanism is transparent to client applications running in the device and is enforced within the hosting device operating system itself, generally by an Access Control Enforcer (ACE) forming part of the Secure Element access API.

GlobalPlatform standard entitled "Secure Element Access Control—version 1.0. specifies how the access policy is stored in the Secure Element, and how it can be accessed and applied by the hosting device.

According to the standard, an access control rule specifies that:

- for a specific SE application, or for all other SE applications on a given SE,
- a given device application or all other device applications have access rights to:
  - all APDUs, no APDUs, or selected APDUs;
  - all NFC events or no NFC events, NFC standing for "Near Field Communication".

The SE and device applications specified in the access control rule form the target or premises of the rule, while the access rights to APDUs and NFC events form the conclusion of the rule.

In operation, when a device application requests access to a SE application, a SE API (an API for device applications to interact with applications hosted by a Secure Element) invokes the Access Control Enforcer with the identifier (or DeviceAppID which is for example a hash of the device application code) of the device application requesting the access and the identifier (or AID) of the SE application to which the access is requested. Then, the Access Control Enforcer is in charge of retrieving (using for example a "GET DATA" command as defined in the above-mentioned standard) the Access Rules applicable for the corresponding device application and SE application. If the access is granted, the SE API access request is accepted and the device application is allowed to exchange commands (e.g. APDUs) with the SE application. If the access is not granted, the SE API request is rejected and the device application is not able to exchange commands (e.g. APDUs) with the SE application.

A schematic functional architecture of the hosting device and the Secure Element is shown in FIG. 1, which is taken from the above standard.

The Card Issuer and Application Providers define access control rules (or access rules) for the applications in their respective Security Domain, and supply (for example using a "STORE DATA" command as defined in the above-mentioned standard) to a respective Access Rule Application Client or Master (ARA-C or ARA-M).

The ARA-M (only one in the SE), which is associated with the Card Issuer Security Domain and managed by the Card Issuer (directly or with administration delegation to a remote server entitled Trusted Service Manager), is in charge of retrieving all available access rules after the SE receives a request from the Access Control enforcer on the device.

If necessary, the ARA-M may request (using, for example, a predetermined API interface, method or event) the ARA-Cs associated with the Application Provider Security Domains to retrieve rules stored in these ARA-Cs.

Because an access control rule may not only apply to an individual application, but also to multiple applications, and because separate rules may be defined in different places of the Secure Element (for example, in the ARA-M and in an ARA-C), access control rules may overlap and conflict.

Potential conflicts shall be avoided by the ARA implementation as much as possible. For example it may be provided that any ARA rejects provisioning/supplying of a new access control rule if a rule for the same target (AID and DeviceAppID) already exists in another ARA in the SE. In such a case the Service Provider shall be informed with a dedicated status word ('6A 89').

However, in scenarios it might happen that rules applying to the same target (AID and DeviceAppID) exist in the SE. This is for example the case if the rules are already pre-installed in an ARA and are available immediately after the ARA instantiation.

A rule-priority policy has been proposed in the standard to solve access control rule conflicts in the course of determining which rule to apply.

According to this policy, performed at the ARA-M or at the Access Control Enforcer, specific rules have priority over generic rules, wherein a specific access rule is a rule associating explicitly a DeviceAppID and an AID (the others are generic rules). Additionally, more restrictive rules have priority over less restrictive rules, wherein the most restrictive access rules are those that forbid access the device application to the SE application. In addition, access rules having the same priority may be aggregated as defined in the standard.

SUMMARY OF THE INVENTION

However, this way to operate as defined in the GlobalPlatform standard "Secure Element Access Control—version 1.0" has drawbacks, few of which are introduced with reference to FIG. 2.

A first drawback is shown in FIG. 2*a* where an ARA (ARA-M or ARA-C) provides access restriction to a targeted SE application which is not in its Security Domain.

In a first example of the Figure, the SE Application 3 belongs to (i.e. is installed inside) the Application Provider Security Domain (SD) 1 managed by ARA-C1. However, ARA-M defines an access rule for "SE App 3, Device App 2, APDU NEVER" which is the most restrictive rule regarding APDU. Consequently, ARA-M restricts access to SE Application 3 which is under ARA-C1's control. Device Application 2 will never be granted access rights to communicate through APDUs with SE Application 3 although such rule is set by another SD.

In a second example, the SE Application 4 belongs to the Application Provider SD 2 managed by ARA-C2. However, ARA-C1 defines an access rule for "SE App 4, Device App 1, APDU ALWAYS" while in ARA-C2 itself there is no access rule. Device Application 1 will be granted access rights to communicate through APDUs with SE Application 4 although the Application Provider of the latter has never set a permissive rule in its managing ARA-C2.

These examples show that an Application Provider other than the one of the targeted SE application can voluntarily or non-voluntarily modify (in a more restricting way) the access to the targeted SE application.

Note that several ARAs can store access rules having the same target (AID and DeviceAppID) in some situations. This is for example the case when access rules are preinstalled in the ARAs and then the ARAs are loaded and installed in their respective Security Domains (i.e. of the corresponding Application Provider or Card Issuer).

On the opposite, an Application Provider other than the one of the targeted SE application can voluntarily or non-voluntarily allow access to the targeted SE application. This is illustrated in FIG. 2*b*.

In the example of the Figure, ARA-M stores a general access rule allowing all device applications to access all SE applications, while the ARA-Cs do not yet store access rules.

As a result, any device application (i.e. Device Application 1, Device Application 2 or Device Application 3) can access SE Application 4 although the Application Provider of the Security Domain 2 to which belongs SE Application 4 has not allowed such access by defining corresponding access rules.

The same applies to SE Application 3, an access to which can be allowed to any device application, although its Application Provider (of SD 1) has not defined a permissive access rule.

Another situation with drawbacks is illustrated in FIG. 2*c* where the Application Provider cannot set an access rule controlling its own application, because another access rule with the same target exists in another Security Domain.

This is because the above-mentioned GlobalPlatform standard provides that any ARA shall reject provisioning of a rule if a rule for the same target (AID and DeviceAppID) already exists in another ARA in the SE.

In the Figure, as ARA-M already has an access rule "SE App 3, Device App 2, APDU NEVER", none of ARA-C1 (even though SE App 3 is installed in the SE of ARA-C1) and ARA-C2 can set and store an access rule having the same target, for example an access rule "SE App 3, Device App 2, APDU ALWAYS".

The present invention has been devised to address at least one of the foregoing concerns.

It is also known publication US 2009/025074 and US 2008/022381 which disclose an architecture supporting modular application installations in security tokens.

According to a first aspect of the invention, there is provided a method of enforcing control of access by a device to a secure element hosted in the device, as defined in claim 1.

This configuration of the secure element includes a first variant where an access rule controlling access to an application of the secure element is retrieved by searching only in access rules stored in a security domain to which the application belongs in the secure element and a second variant where an access rule controlling access to an application of the secure element is stored only in a security domain to which the application belongs in the secure element.

According to the above-mentioned standard, the request for retrieving comes from the Access Control Enforcer executed on the hosting device, while the retrieved access rule or rules are output to same ACE.

A better management of access control rules within the Secure Element is thus obtained. This is because the invention forces the secure element to handle only access rules stored in the appropriate Security Domain to which a target SE application belongs. As briefly introduced above, this may be achieved for example either by forcing the storage or provisioning of access rule in the appropriate Security Domain in view of future retrieval or by searching specifically in the access rules stored in the appropriate Security Domain once the latter has been determined from the request for retrieving.

It results that the Application Provider has privilege to fully maintain access rules of its own SE applications using its own ARA-C, without any possibility for the Card Issuer or any other Application Provider to further restrict the access rights to these SE applications by defining other access rules having the same target in their ARA-C/M. Similarly, even if the Application Provider of a SE application has not yet set an access rule on this SE application, the Card Issuer or any other Application Provider cannot allow access to the SE application, as the above-mentioned standard enables it.

As a consequence, the conflict resolution mechanism as defined in the standard is no longer required: the ARA-M will only return the valid Access Rule from the responsible ARA (associated with the SD to which the SE application belongs). The ARA-M will ignore access rules that are stored in other ARA, if any.

Correspondingly, according to a second aspect of the invention, there is provided a secure element for enforcing access control by a device hosting the secure element, as defined in claim 6.

The secure element has the same advantages as the above-defined method.

According to the invention, an access rule controlling access to an application of the secure element is retrieved by searching only in access rules stored in a security domain to which the application belongs in the secure element. This is the role of the access rule application master (ARA-M) of the Secure Element receiving the request, which ARA-M will request the appropriate ARA-C (corresponding to the specific Security Domain), if appropriate.

Thanks to this provision, the processing load is lightened compared to the known techniques. In particular, as the number of ARA-C involved in the SE increases the processing load is more and more lightened.

The lightening results from the search that is restricted within a restricted amount of access rules, namely the access rules of the ARA hosting the searched SE application. The access rules of the other ARAs will never been considered during the processing of the received request.

In particular, the method comprises, upon receiving the request:

first determining a security domain to which the application belongs in the secure element, and then, searching for an access rule controlling access to the application, only in the access rules stored in the determined security domain.

This feature optimizes low processing load.

Further features of embodiments of the invention are defined in the dependent appended claims and are explained below in terms of method features.

In particular, the method may further comprise storing an identifier of the determined security domain in a memory of the secure element, to force at least one subsequent access rule search in the access rules stored in the determined security domain.

This is particularly advantageous in the context of the above-mentioned GP standard "Secure Element Access Control—version 1.0". This is because the latter defines an iterative process for the Access Control Enforcer of the hosting device to retrieve the relevant access rules. In details, (1) the ACE requests for a specific rule, meaning that the target (specific AID, specific DeviceAppID) is specified therein; (2) if no rule is found, the ACE requests for a generic rule targeting (specific AID, non-specific DeviceAppID); (3) if no rule is found again, the ACE requests for another generic rule targeting (non-specific AID, specific DeviceAppID); and (4) if still no rule is found, the ACE requests for an even more generic rule targeting (non-specific AID, non-specific DeviceAppID). A "non-specific AID" or "non-specific DeviceAppID" may encompass "all AIDS" or "all DeviceAppIDs".

In this context, the above provision ensures the rule searches at iterations (2) to (4) to be performed only in the access rules stored in the relevant Security Domain (relevant to the SE application specified in the request of the first iteration). As a consequence, the load of processing is reduced for the iterations (2) to (4).

According to embodiments of the invention, the access rule provides an access to at least one APDU or to at least one NFC event. This makes it possible for the device application to be granted actual communication with an application of the secure element.

According to a third aspect of the invention, there is provided a device, for example a mobile phone, hosting a secure element as defined above. The hosting device may then include an access control enforcer to enforce control of access to the secure element.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 3:
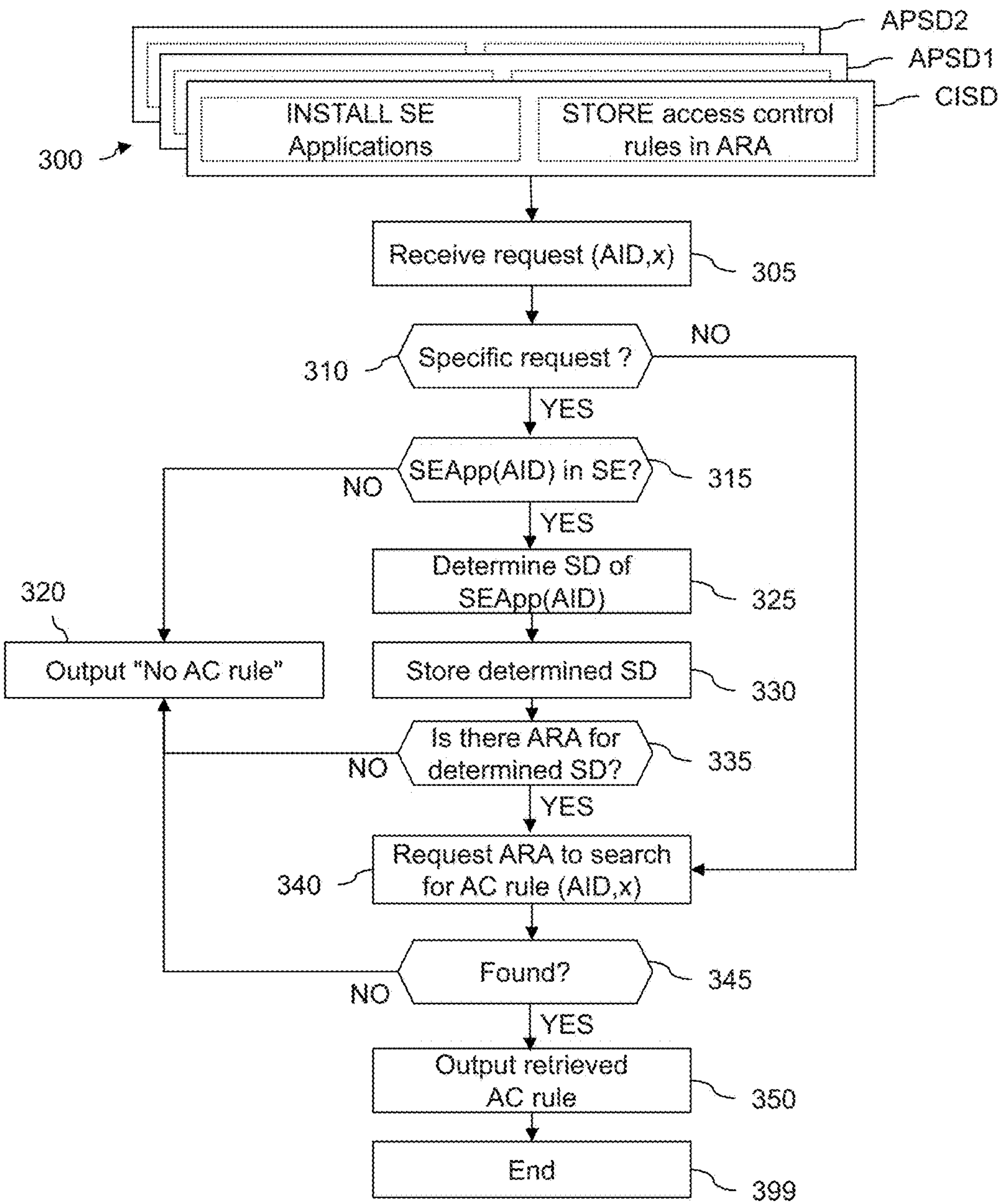
FIG. 3 is a flowchart illustrating main steps of a first embodiment of the invention.

FIG. 3 is a flowchart illustrating main steps of a first embodiment of the invention.

A method of enforcing control of access by a device to a secure element hosted in the device, according to this first embodiment, comprises the following steps performed by the secure element:

receiving a request for retrieving at least one access rule controlling access to at least one application of the secure element, from access rules stored in the secure element, outputting at least one access rule retrieved from the stored access rules, wherein an access rule controlling access to an application of the secure element is retrieved by searching only in access rules stored in a security domain to which the application belongs in the secure element.

This searching is generally initiated by the ARA-M of the SE upon receiving a request for retrieving access control rules based on a target (AID, DeviceAppID). In case the relevant Security Domain is the one of the ARA-M, the latter does the search. In case the relevant Security Domain belongs to an Application Provider, the ARA-M then requests the ARA-C of the relevant Security Domain to perform the search within its stored rules.

At step 300, SE applications are installed in the SE by the Card Issuer and/or Application Providers, in particular within their respective Security Domains. As known from specification "GlobalPlatform Card Specification—Version 2.2.1", the APDU command "INSTALL" may be used to that purpose.

Note that an identifier AID of each SE application (or applet) is defined during the INSTALL process. The AID may be specified as a parameter of the INSTALL command, or a function may be used to that effect.

Still at step 300, one or more access control (AC) rules are set by the Card Issuer and/or Application Providers, and stored in the respective ARAs (i.e. in their respective Security Domains) using for example the STORE DATA—Store AR-DO command defined in GlobalPlatform standard entitled "Secure Element Access Control—version 1.0".

Three Security Domains are illustrated in the Figure: the Security Domain of the Card Issuer (or CISD), the Security Domain of a first Application Provider (or APSD1) and the Security Domain of a second Application Provider (or APSD2).

Note that the Access Control rules (AC rules) may be pre-installed in the ARA before the latter are loaded in the SE.

In such a way to load AC rules in the ARAs, there may be conflicting rules targeting the same AID, some of them possibly defined in ARAs of SDs others than the SD hosting the SE application AID.

Also note that if a SE application is deleted from the SE, AC rules targeting this specific SE application are not automatically deleted. The Issuer or Application Provider shall delete them manually, using for example the STORE DATA—Delete AR-DO command.

A device application of the hosting device wishes to access a SE application of the SE. To this end, the device application invokes the Access Control Enforcer (ACE) which sends a request to the SE for retrieving the AC rules controlling access to the SE application from the rules stored in the SE.

The request may be specific in that it specifies the AID of the SE application to access and the DeviceAppID of the requesting device application. The APDU command "GET DATA" defined in the above-mentioned standard may be used to send the request from the ACE to the SE. The request is noted REQ(AID, DeviceAppID).

At step 305, the SE, and more particularly the ARA-M, receives the request from the ACE.

At step 310, the ARA-M determines whether or not the received request is specific, i.e. whether it includes a specific AID and a specific DeviceAppID.

If the request is specific, the ARA-M determines whether or not the specified AID corresponds to a SE application installed in the SE, at step 315. This step may be implemented using an association table SE application/Security Domain accessible to the ARA-M, or by sending a request to each ARA-C of the Secure Element.

If no installed SE application corresponds to the specified AID, the ARA-M output a "No AC rule" to the Access Control Enforcer, at step 320.

If an installed SE application that corresponds to the specified AID exists, the ARA-M determines the security domain (from among CISD, APSD1 and APSD2) to which the SE application with identifier AID belongs in the secure element. This is step 325.

An identifier of the determined security domain is then stored, at optional step 330, in a memory of the secure element, for example a non-volatile memory. As explained below, this stored identifier makes it possible to force at least one subsequent access rule search in the access rules stored in the determined security domain, thus avoiding considering all the AC rules stored in the SE.

At step 335, the ARA-M determines whether or not the determined SD has an ARA, which may be the ARA-M or any ARA-C of the Application Provider Security Domains. Each Security Domain may have at most one ARA that is registered to the ARA-M, thus making it possible to quickly know the ARA corresponding to the determined SD.

In case no ARA is found at step 335, the ARA-M output a "No AC rule" to the Access Control Enforcer, at step 320.

In case an ARA is found at step 335, step 340 consists in searching for an access rule controlling access to the application, only in the access rules stored in the determined security domain. It is thus avoided considering all the AC rules stored in the SE.

If the ARA found at step 335 is ARA-M, the latter performs the search by itself within the AC rules it currently stores.

If the ARA found at step 335 is one of the ARA-C installed in the SE, the ARA-M requests the found ARA-C to retrieve the AC rules, at step 340. The ARA-M may forward the request REQ (AID, DeviceAppID).

It results that the ARA-C performs a search within the AC rules it stores, as conventionally done. If at least one AC rule is found, it is returned to the ARA-M.

At step 345, the ARA-M checks whether at least one AC rule has been found.

If not, the ARA-M output a "No AC rule" to the Access Control Enforcer, at step 320.

If at least one AC rule has been found, the retrieved AC rule or rules are set as output to the Access Control Enforcer at step 350, and the process ends at step 399. In such situation, it is the ACE which may perform rule conflict resolution if two or more AC rules are output.

In a variant, the rule conflict resolution may be performed by the ARA-M, in which case only one AC rule is output to the ACE at step 350.

As introduced above, the Access Control Enforcer performs an iterative process to retrieve the relevant access rules concerning AID and DeviceAppID. The first iteration may be as explained until now with reference to FIG. 3.

In case no AC rule is output to the Access Control Enforcer at this first iteration, a second iteration consists for the ACE to request the SE for retrieving a generic rule targeting (specific AID, non-specific DeviceAppID). If no rule is found again, the next iteration consists for the ACE in requesting the SE for retrieving another generic rule targeting (non-specific AID, specific DeviceAppID). Lastly, if still no rule is found, the next and final iteration consists, for the ACE, in requesting the SE for retrieving an even more generic rule targeting (non-specific AID, non-specific DeviceAppID).

In such an iterative process, one understands that a negative outcome at step 310 may occur only for the second iteration to the last iteration of the process. In such situation, the process according to the first embodiment of the invention provides that the search is immediately performed at step 340 (without performing steps 315-335) using the determined SD stored during the first iteration.

This leads to searching only in the AC rules of the determined SD. This is because it is already known thanks to the first iteration in which SD the searched AC rule is.

While the above described example is based on a specific request targeting a specific AID and a specific DeviceAppID, a variant may rely on a request that only specifies the AID of the SE application, regardless whether or not any DeviceAppID is specified therein. This is because steps 300-399 do not depend on the DeviceAppId (except for searching the relevant AC rules). Steps 310 and 330 are not implemented in such a single-iteration process.

In another variant, the request may be generic as far as the AID is concerned (for example by targeting all the AIDS). In such situation, upon receiving the request at step 305 and before step 325 (steps 310, 315 and 330 are not implemented), the ARA-M may determine all the SE applications stored in the SE and then resumes the process at step 325 for each of the determined SE applications.

Figure 4:
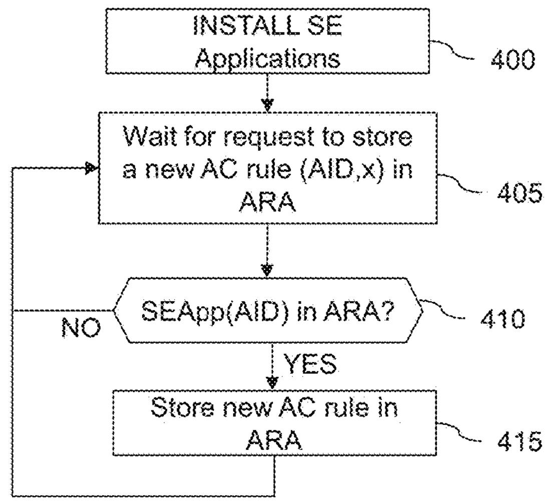
FIG. 4 is a flowchart illustrating main steps of a second embodiment of the invention.

FIG. 4 is a flowchart illustrating main steps of a second embodiment of the invention.

A method of enforcing control of access by a device to a secure element hosted in the device, according to this second embodiment, comprises the following steps performed by the secure element:

receiving a request for retrieving at least one access rule controlling access to at least one application of the secure element, from access rules stored in the secure element, outputting at least one access rule retrieved from the stored access rules, wherein an access rule controlling access to an application of the secure element is stored only in a security domain to which the application belongs in the secure element.

This embodiment focuses on the authorization given by the SE in the process of provisioning new AC rules. In particular, the secure element authorizes the storing of a new access rule controlling access to an application of the secure element only in a security domain to which the application belongs in the secure element.

One thus understands that this policy forces that an AC rule on an AID can only be stored in the corresponding SD.

The particular features of this second embodiment thus concern the storing of AC rules before a request from the ACE is sent to the SE.

At step 400, SE applications are installed in the SE by the Card Issuer and/or Application Providers, in particular within their respective Security Domains, as described above for step 300.

In the second embodiment of the invention, the installation of the SE applications must be done prior to defining and storing AC rules targeting specifically these SE applications. This is because the control of storing involves knowing the SD in which such SE applications are actually stored.

When the SE applications are installed in their respective SDs in the SE, the SE is waiting for new requests (STORE DATA—Store AR-DO command) from the Card Issuer or Application Providers (via Trusted Service Manager) to define and store a new AC rule regarding a specific SE application. This is step 405.

Each such request is directed to the ARA of the corresponding Security Domain (CISD for the Card Issuer, APSD1 or APSD2 for the Application Providers).

Upon receiving such request, step 410 is triggered wherein the ARA receiving the request, ARA-C or ARA-M, checks whether the specific SE application (the AID specified in the new AC rule of the request) belongs to the same security domain as his.

If not, the process loops back to step 405 waiting for a next request.

Figure 1:
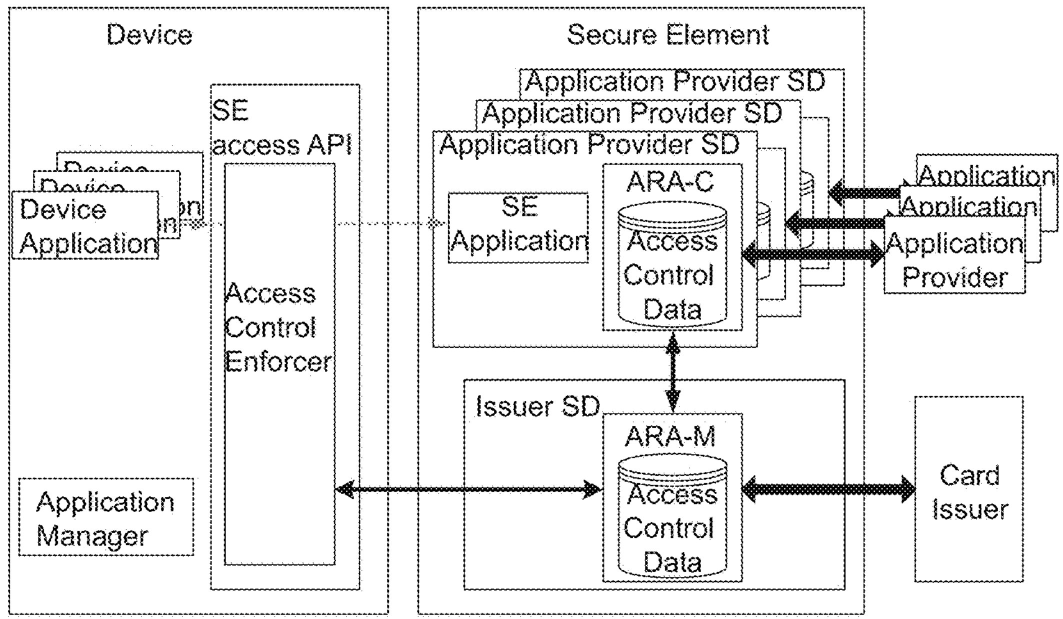
FIG. 1 illustrates access control architecture to enforce control of access to a secure element.

If they (ARA and specific SE application) belong to the same SD, the ARA stores the new access rule in its database as shown in FIG. 1, at step 415, and the process loops back to step 405 waiting for a next request.

In parallel, any request from the ACE, for example REQ(AID, DeviceAppID), is processed by the ARA-M in the conventional way (defined in the above-mentioned standard). Thanks to the AC rule storage policy, no AC rule targeting specifically the AID can be defined in ARAs other than the ARA of the SD hosting said AID.

These two embodiments of the invention overcome all or parts of the drawbacks defined above.

Figure 2A:
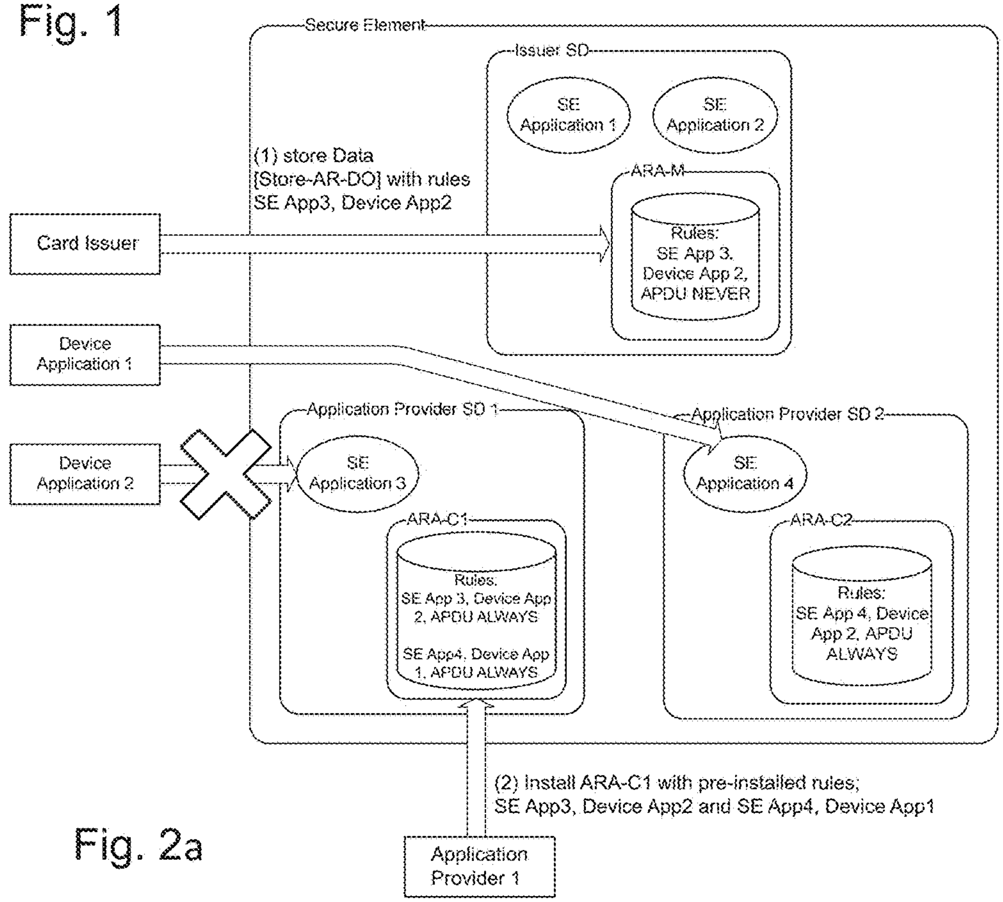
FIGS. 2*a* to 2*c* illustrates scenarios with drawbacks of access control rule management in known systems.

For example, in the case of FIG. 2*a*, even though the AC rule for "SE App 3, Device App 2, APDU NEVER" already existed in ARA-M (situation that may happen in the first embodiment), this AC rule will be ignored in the rule searching because SE Application 3 is not installed in the Card Issuer SD which is managed by ARA-M.

Figure 5A:
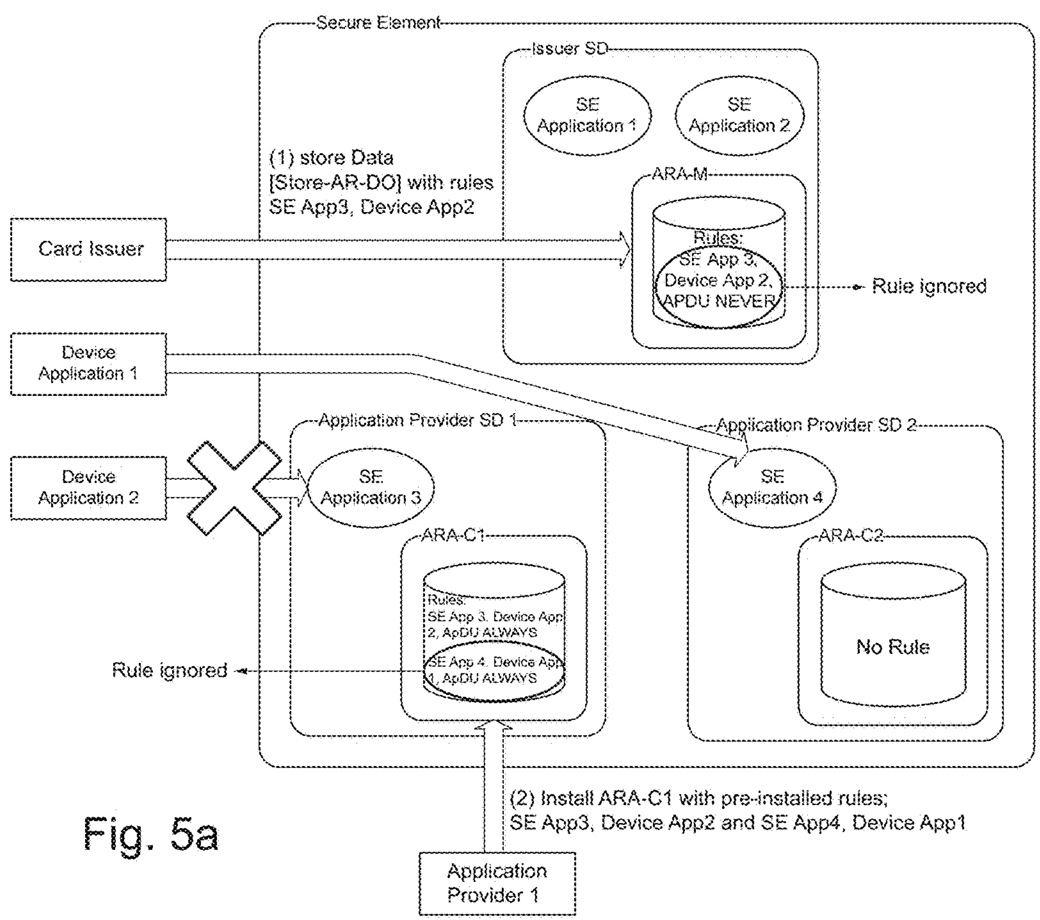
FIGS. 5*a* to 5*c* illustrates the benefits of the invention on the scenarios of FIGS. 2*a* to 2*c*.

As a consequence, if the Application Provider 1 has pre-installed AC rule "SE App 3, Device App 2, APDU ALWAYS" in its ARA-C1, this AC rule can be used without any interference with the AC rule stored in another ARA, such as ARA-M storing "SE App 3, Device App 2, APDU NEVER", even though ARA-M has a more restrictive rule than ARA-C1. This is because the SE Application 3 is installed in the Application Provider SD 1 which is managed by ARA-C1 (see FIG. 5*a*).

Similarly, although ARA-C1 stores the AC rule "SE App 4, Device App 1, APDU ALWAYS", the application "SE App 4" that is part of the security domain SD2 managed by the Application Provider 2 cannot be accessed by any device application until Application Provider 2 defines the particular AC rule. ARA-M ignores the AC rules of ARA-C1 during the rule searching because SE App 4 does not belong to Application Provider SD 1, and only considers the AC rules stored in ARA-C2. As a result, Device Application 1 is not allowed to access SE Application 4 since there is no AC rule defined inside ARA-C2 (see FIG. 5*a*).

Figure 2B:
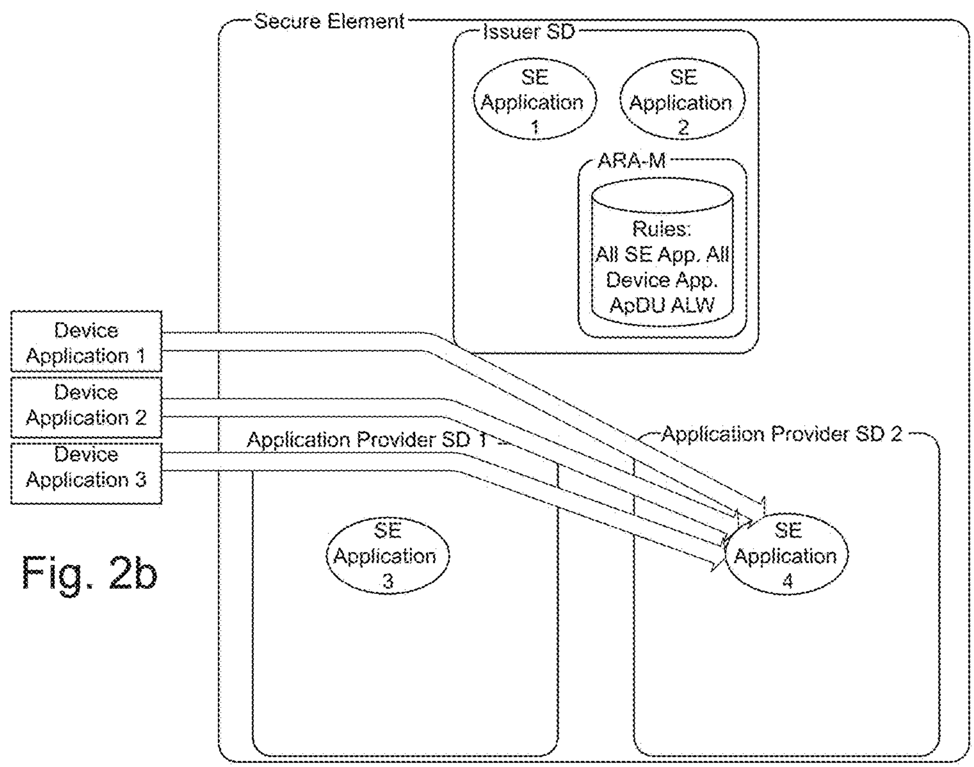
Figure 5B:
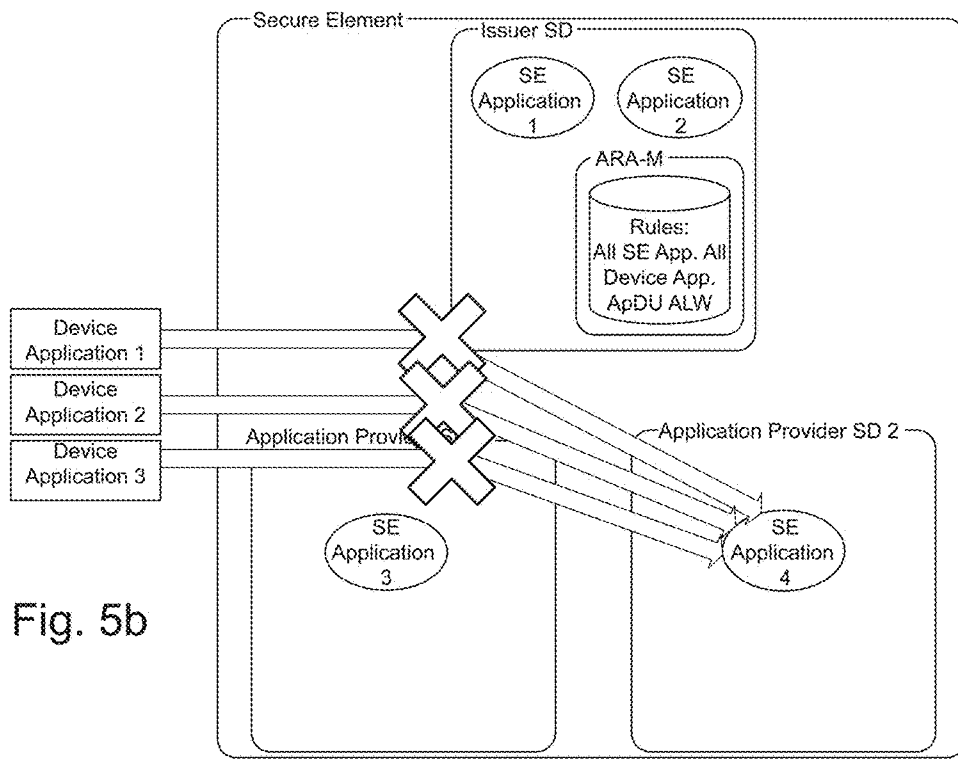

In the case of FIG. 2*b*, the AC rule defined in ARA-M has an effect on the SE applications installed in the same SD, i.e. the Card Issuer Security Domain. Given the AC rule shown in the Figure, that means that all Device Applications can only access all SE applications that are installed in Card Issuer SD. In other words, all device applications have APDU access to SE Application 1 and SE Application 2. But Device Applications cannot access SE Application 4 and SE Application 3 because there is no ARA and corresponding AC rules in their security domains (see FIG. 5*b*).

Figure 2C:
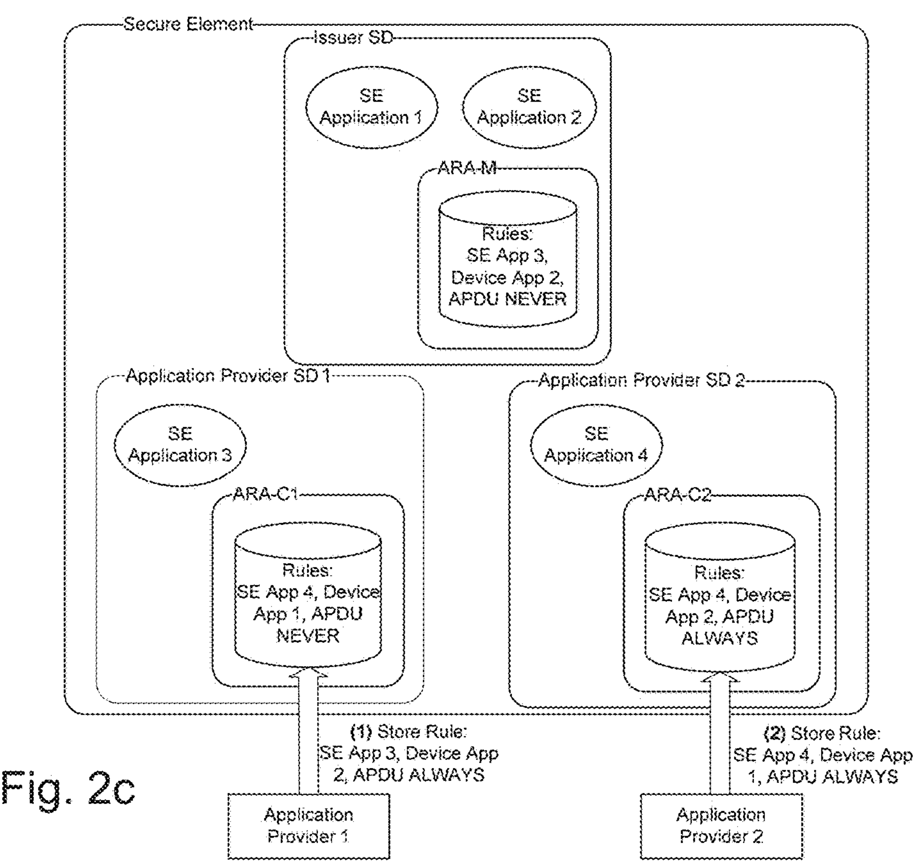

In the case of FIG. 2*c*, new AC rules targeting a specific AID can be stored in the ARA by the Application Provider of the SE application, since the implementations of the invention does not restrict addition of an AC rule in the ARA corresponding to the AID targeted in the AC rule.

As a consequence, Application Provider 1 is able to load and store AC rule "SE App 3, Device App 2, APDU ALWAYS" in its ARA-C1, and Application Provider 2 is able to load and store AC rule "SE App 4, Device App 1, APDU ALWAYS" in its ARA-C2, even though conflicting rules targeting the same AID (according to the known techniques) already exist in ARA-M and ARA-C1 respectively.

In addition, these conflicting rules will be ignored by ARA-M since they target AIDs belonging to other SDs.

Figure 5C:
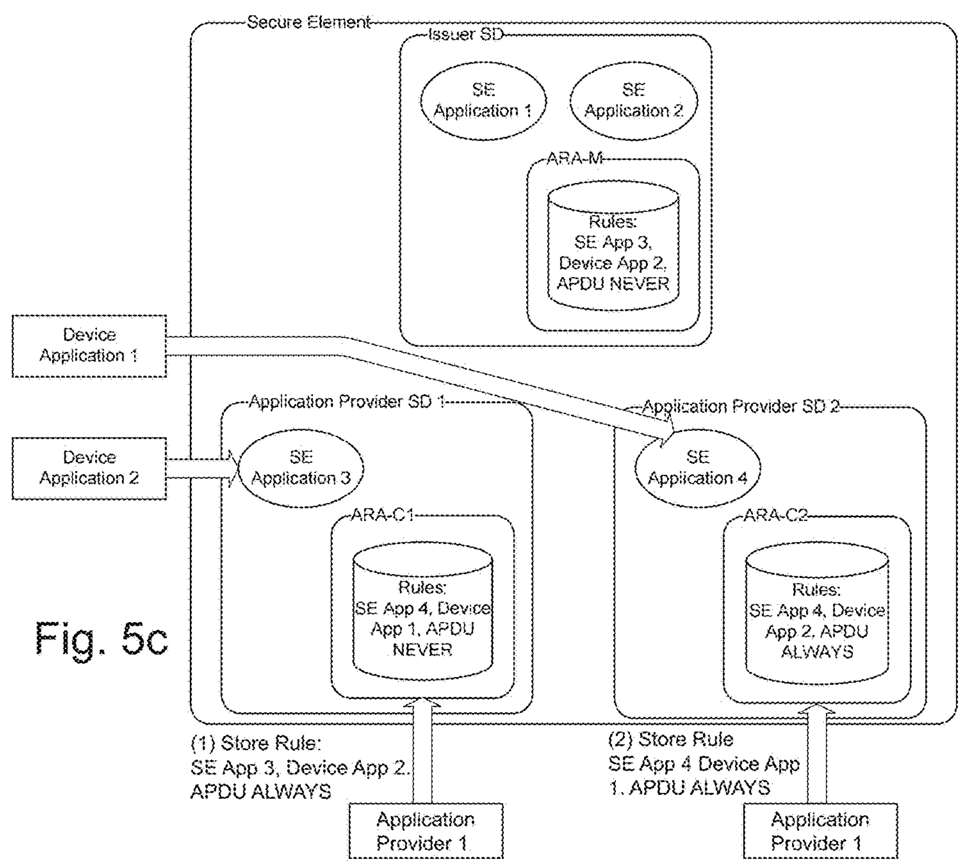

As a result, Device Application 1 and Device Application 2 will be allowed to access SE Application 4 and SE Application 3 respectively because their respective ARA-Cs have access rules ALWAYS for these SE applications (see FIG. 5*c*).

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of enforcing control of access by a hosting device to a secure element hosted in the hosting device, the secure element including a master security domain and at least one other security domain, each security domain storing one or more access rules, each access rule identifying at least one application of the secure element to control access to the application, the method comprising the following steps performed by an access rule application of the master security domain of the secure element:

receiving a first request from a requesting application at the hosting device, for retrieving at least one access rule controlling access to at least one target application of the secure element, from access rules stored in the secure element, the first request including an identifier identifying the at least one target application;

outputting, to the hosting device, at least one access rule retrieved from the stored access rules;

enforcing the output access rule by an access control enforcer of the hosting device;

upon receiving the first request:

first determining, based on the identifier identifying the target application in the first request, a security domain to which the target application belongs in the secure element from amongst the security domains of the secure element, and then requesting only the determined security domain to search for an access rule identifying the target application to control access to the target application, only in the access rules stored in the determined security domain; and by the access rule application of the master security domain of the secure element:

storing an identifier of the determined security domain in a memory of the secure element, and when no rule has been found by the requested determined security domain in response to the received first request, upon receiving a new request from the hosting device for retrieving a more generic access rule controlling access to the target application, using the stored identifier to again request the determined security domain to search for the more generic access rule, only in the access rules stored in the determined security domain, the more generic access rule being more generic than the access rule requested in the first request, the new request including the identifier identifying the target application of the secure element;

wherein the first request for retrieving at least one access rule is received from the access control enforcer executed on the hosting device.

2. The method of claim 1, wherein the secure element is according to a GlobalPlatform standard.

3. The method of claim 1, wherein the more generic access rule provides an access to at least one application protocol data unit (APDU) or to at least one near field communication (NFC) event.

4. A secure element hosted in a device, comprising:

a master security domain and at least one other security domain, each security domain storing one or more access rules, each access rule identifying at least one application of the secure element to control access to the application, wherein the master security domain includes an access rule application comprising:

a receiving module configured to receive a first request from a requesting application at a hosting device, for retrieving at least one access rule controlling access to at least one target application of the secure element, from access rules stored in the secure element, the first request including an identifier identifying the at least one target application, and an output module configured to output, to the hosting device, at least one access rule retrieved from the stored access rules, the access rule application of the master security domain being configured, upon receiving the first request, to:

first determine, based on the identifier identifying the target application in the first request, a security domain to which the target application belongs in the secure element from among the security domains of the secure element, and then request only the determined security domain to search for an access rule identifying the target application to control access to the target application, only in the access rules stored in the determined security domain, wherein the access rule application of the master security domain comprises a register in a memory to store an identifier of the determined security domain, and when no rule has been found by the requested determined security domain in response to the received first request, upon receiving a new request from the hosting device for retrieving a more generic access rule controlling access to the target application, using the stored identifier to again request the determined security domain to search for the more generic access rule, only in the access rules stored in the determined security domain, the more generic access rule being more generic than the access rule requested in the first request, the new request including the identifier identifying the target application of the secure element, wherein the first request for retrieving at least one access rule is received from an access control enforcer executed on the hosting device.

5. The secure element of claim 4, wherein the secure element is according to a GlobalPlatform standard.

* * * * *